(12) United States Patent
Iwasaki et al.

(10) Patent No.: US 9,569,314 B2
(45) Date of Patent: Feb. 14, 2017

(54) FLASH COPY FOR DISASTER RECOVERY (DR) TESTING

(71) Applicant: International Business Machines Corporation, Armonk, NY (US)

(72) Inventors: Norie Iwasaki, Fujisawa (JP); Katsuyoshi Katori, Kawasaki (JP); Koichi Masuda, Yokohama (JP); Takeshi Nohta, Tsukuba (JP); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/018,480

(22) Filed: Feb. 8, 2016

(65) Prior Publication Data

US 2016/0154711 A1    Jun. 2, 2016

Related U.S. Application Data

(63) Continuation of application No. 14/094,684, filed on Dec. 2, 2013, now Pat. No. 9,304,871.

(51) Int. Cl.
*G06F 17/00* (2006.01)
*G06F 11/14* (2006.01)
*G06F 17/30* (2006.01)
*G06F 11/27* (2006.01)
*G06F 11/20* (2006.01)

(52) U.S. Cl.
CPC ....... *G06F 11/1469* (2013.01); *G06F 11/1451* (2013.01); *G06F 11/27* (2013.01); *G06F 17/30088* (2013.01); *G06F 11/2023* (2013.01); *G06F 11/2028* (2013.01); *G06F 2201/805* (2013.01); *G06F 2201/84* (2013.01)

(58) Field of Classification Search
CPC .... G06F 17/30088; G06F 17/30; G06F 17/00; G06F 11/16; G06F 11/1662
USPC .................................................. 707/600–899
See application file for complete search history.

(56) References Cited

U.S. PATENT DOCUMENTS

| | | | |
|---|---|---|---|
| 6,732,294 B2 | 5/2004 | Mackrory et al. | |
| 7,302,540 B1 | 11/2007 | Holdman et al. | |
| 7,644,046 B1 * | 1/2010 | Keeton ............... | G06F 11/3409 705/1.1 |
| 7,765,433 B1 | 7/2010 | Krishnamurthy | |

(Continued)

OTHER PUBLICATIONS

Iwasaki et al., U.S. Appl. No. 15/018,540, filed Feb. 8, 2016.
Iwasaki et al., U.S. Appl. No. 15/018,622, filed Feb. 8, 2016.
Non-Final Office Action from U.S Appl. No. 14/094,681, dated May 20, 2015.
Iwasaki et al., U.S. Appl. No. 14/094,681, filed Dec. 2, 2013.

(Continued)

*Primary Examiner* — Isaac M Woo
(74) *Attorney, Agent, or Firm* — Zilka-Kotab, PC

(57) ABSTRACT

In one embodiment, a method for disaster recovery (DR) testing includes creating a snapshot of data based on a backup copy of data stored on one or more production clusters or a live copy of the data and storing the snapshot on more than one DR cluster within a DR family, determining which cluster within the DR family to access the snapshot from based on a consistency of the snapshot in relation to data on the one or more production clusters at a time-zero, accessing the snapshot of data stored on the determined DR cluster within the DR family only when the snapshot was made consistent with respect to data on the one or more production clusters within the DR family before the time-zero, and performing DR testing using the snapshot.

10 Claims, 7 Drawing Sheets

(56) References Cited

U.S. PATENT DOCUMENTS

| | | |
|---|---|---|
| 7,921,268 B2 | 4/2011 | Jakob |
| 7,991,822 B2 | 8/2011 | Bish et al. |
| 8,019,723 B2 | 9/2011 | Bish et al. |
| 8,020,037 B1 | 9/2011 | Schwartz et al. |
| 8,234,464 B2 | 7/2012 | Bish et al. |
| 8,327,106 B2 | 12/2012 | Peake et al. |
| 8,359,491 B1 | 1/2013 | Bloomstein |
| 8,478,955 B1 | 7/2013 | Natanzon et al. |
| 8,521,975 B2 | 8/2013 | Bish et al. |
| 9,262,290 B2 | 2/2016 | Iwasaki et al. |
| 9,286,366 B2 | 3/2016 | Iwasaki et al. |
| 9,304,871 B2 | 4/2016 | Iwasaki et al. |
| 2004/0059805 A1 | 3/2004 | Dinker et al. |
| 2012/0151273 A1 | 6/2012 | Ben Or et al. |
| 2012/0290805 A1 | 11/2012 | Bish et al. |
| 2012/0324183 A1 | 12/2012 | Chiruvolu et al. |
| 2014/0215255 A1 | 7/2014 | Zaheer |
| 2015/0154084 A1 | 6/2015 | Iwasaki et al. |
| 2015/0154085 A1 | 6/2015 | Iwasaki et al. |
| 2015/0154271 A1 | 6/2015 | Iwasaki et al. |
| 2016/0140008 A1 | 5/2016 | Iwasaki et al. |
| 2016/0154706 A1 | 6/2016 | Iwasaki et al. |
| 2016/0154712 A1 | 6/2016 | Iwasaki et al. |
| 2016/0154872 A1 | 6/2016 | Iwasaki et al. |

OTHER PUBLICATIONS

Iwasaki et al., U.S. Appl. No. 14/094,684, filed Dec. 2, 2013.
Iwasaki et al., U.S. Appl. No. 14/094,689, filed Dec. 2, 2013.
Final Office Action from U.S. Appl. No. 14/094,681, dated Sep. 8, 2015.
Non-Final Office Action from U.S. Appl. No. 14/094,684, dated Sep. 8, 2015.
Non-Final Office Action from U.S. Appl. No. 14/094,689, dated Aug. 20, 2015.
Notice of Allowance from U.S. Appl. No. 14/094,681, dated Oct. 26, 2015.
Notice of Allowance from U.S. Appl. No. 14/094,689, dated Nov. 20, 2015.
Notice of Allowance from U.S. Appl. No. 14/094,684, dated Dec. 22, 2015.
Iwasaki et al., U.S. Appl. No. 15/006,873, filed Jan. 26, 2016.
Iwasaki et al., U.S. Appl. No. 15/006,931, filed Jan. 26, 2016.
Notice of Allowance from U.S. Appl. No. 15/018,540, dated Jun. 24, 2016.
Non-Final Office Action from U.S. Appl. No. 15/018,622, dated Jun. 28, 2016.
Notice of Allowance from U.S. Appl. No. 15/018,540, dated Sep. 16, 2016.
Notice of Allowance from U.S. Appl. No. 15/018,622, dated Oct. 7, 2016.

* cited by examiner

FLASH COPY FOR DISASTER RECOVERY (DR) TESTING

BACKGROUND

The present invention relates to data storage, and more particularly, to systems and methods configured to enable efficient flash copy for disaster recovery (DR) testing.

Some data storage systems are capable of creating a point-in-time copy of virtual tapes for disaster recovery (DR) testing. One such data storage system is IBM's TS7700 Grid Architecture. This capability allows business operations to help simulate and test the ability to resume in the event of a product or a site failure. In such a grid configuration, up to six clusters (or sites) are interconnected and are configured to replicate data created on any of the clusters in the configuration. As part of a total systems design, business continuity procedures are developed to instruct information/technology (I/T) personnel in the actions that should be taken in the event of a system failure. Testing of those procedures (also known as DR testing) is performed either during initial installation of the system and/or at some regular interval after initial installation.

During the DR testing, users make an attempt to simulate a true disaster when one or more clusters are unavailable at a first cluster or site (such as a production cluster or site). A DR host system is restored and cluster data is accessed through a user's predefined DR cluster or clusters. Even though the predefined cluster or clusters have provided some DR testing features, generally, to help the user simulate a true disaster, there are still a few problems related to the DR testing with such clusters.

One such problem is the ability to support a complete set of point-in-time copies of all virtual tapes for DR testing use only. In a real world case, the point in time in which the production cluster (or production environment) becomes unavailable is not predictable, thus the state of the cluster or clusters is unpredictable with respect to the consistency of the replicated data. Data may have not yet completed replication to a DR cluster or site, or the replication for some data may not have even started. With conventional DR testing, copies continue after the DR testing has started, which provides misleading results because the copy would have stopped and the data not be available had a real disaster taken place. In addition, if copies are not available on the DR cluster or clusters, the DR host system will simply access remote content through the grid, which also typically is not possible in a true disaster scenario. Also, data on a production cluster which is modified via the production host will also be modified on the other DR cluster(s) or site(s) of the grid.

In contrast to this capability, users prefer to mimic the consistency of the DR cluster(s) or site(s) at a time-zero (time of the simulated disaster). Only data consistent within the DR cluster(s) or site(s) at time zero should be accessible to a DR test host. Some users accomplish this today by disconnecting the DR cluster(s) or site(s) from the production cluster(s) or site(s). But most users require the actual production data to still continue to replicate to the DR cluster(s) or site(s) so that in the event of a true (not simulated) disaster, this data is properly backed up.

Flash copy concepts exist in some storage products which offer business continuance testing, but the consistency awareness is limited to a single node or a cluster. However, some storage products offering grid architecture allow a user to have more than one cluster or site representing DR data. A method to flash more than one cluster/node in order to create a composite consistency point in time is not currently available.

This is due to several reasons. First, during a DR test, it is preferred that both a DR host and a production host are able to mount a virtual tape with a same identifier (such as a volume serial number "volser") at the same time. However, with conventional systems, these mounts are serialized because of how the virtual tape ownership concept operates, restricting access to any virtual tape to only one accessing system at a time. In other words, at any given time, only one host is allowed to mount a virtual tape in current grid architectures. In order to perform a DR testing as desired by users, this protected concept of mounting a virtual tape with one host at any given time must be relaxed or modified.

In addition, production hosts may change an attribute of data or volumes, reuse data or volumes, and/or modify data or volumes. All these use cases should not alter the time-zero view at the DR cluster(s) or site(s). Existing flash copy solutions are able to accommodate data changes, but keeping track of volume attribute changes is not currently available in grid architectures.

BRIEF SUMMARY

In one embodiment, a method for disaster recovery (DR) testing includes creating a snapshot of data based on a backup copy of data stored on one or more production clusters or a live copy of the data and storing the snapshot on more than one DR cluster within a DR family. The method also includes determining which cluster within the DR family to access the snapshot from based on a consistency of the snapshot in relation to data on the one or more production clusters at a time-zero, and accessing the snapshot of data stored on the determined DR cluster within the DR family only when the snapshot was made consistent with respect to data on the one or more production clusters within the DR family before the time-zero. Moreover, the method includes performing DR testing using the snapshot and defining and managing unique, independent ownerships of the backup copy, an active virtual tape from which data for the backup copy was copied, and the snapshot. Also, the method includes allowing a DR host to mount a first virtual tape having a first identifier that includes the backup copy and/or a second virtual tape having the first identifier that includes the snapshot simultaneously with a production host mounting a third virtual tape having the first identifier that includes the data stored to the one or more production clusters. The time-zero represents a time selected to simulate a disaster, the DR family includes one or more DR clusters accessible to the DR host and the one or more production clusters accessible to the production host, each DR cluster includes one or more storage nodes representing a storage device, and the DR host is configured to replicate data from the one or more production clusters to the one or more DR clusters.

In another embodiment, a computer program product for DR testing includes a computer readable storage medium having program instructions embodied therewith. The program instructions are readable and/or executable by a processor to cause the processor to create, by the processor, a snapshot of data based on a backup copy of data stored on one or more production clusters or a live copy of the data, and store, by the processor, the snapshot on more than one DR cluster within a DR family. The program instructions are readable and/or executable by the processor to cause the processor to determine, by the processor, which cluster within the DR family to access the snapshot from based on a consistency of the snapshot in relation to data on the one or more production clusters at a time-zero, and access, by the processor, the snapshot of data stored on the determined DR cluster within the DR family only when the snapshot was made consistent with respect to data on the one or more production clusters within the DR family before the time-zero. Moreover, the program instructions are readable and/or executable by the processor to cause the processor to perform, by the processor, DR testing using the snapshot, and define and manage, by the processor, unique, independent ownerships of the backup copy, an active virtual tape from which data for the backup copy was copied, and the snapshot. Also, the program instructions are readable and/or executable by the processor to cause the processor to allow, by the processor, a DR host to mount a first virtual tape having a first identifier that includes the backup copy and/or a second virtual tape having the first identifier that includes the snapshot simultaneously with a production host mounting a third virtual tape having the first identifier that includes the data stored to the one or more production clusters. The time-zero represents a time selected to simulate a disaster, the DR family includes one or more DR clusters accessible to the DR host and the one or more production clusters accessible to the production host, each DR cluster includes one or more storage nodes representing a storage device, and the DR host is configured to replicate data from the one or more production clusters to the one or more DR clusters Other aspects and embodiments of the present invention will become apparent from the following detailed description, which, when taken in conjunction with the drawings, illustrates by way of example the principles of the invention.

DETAILED DESCRIPTION

Figure 1:
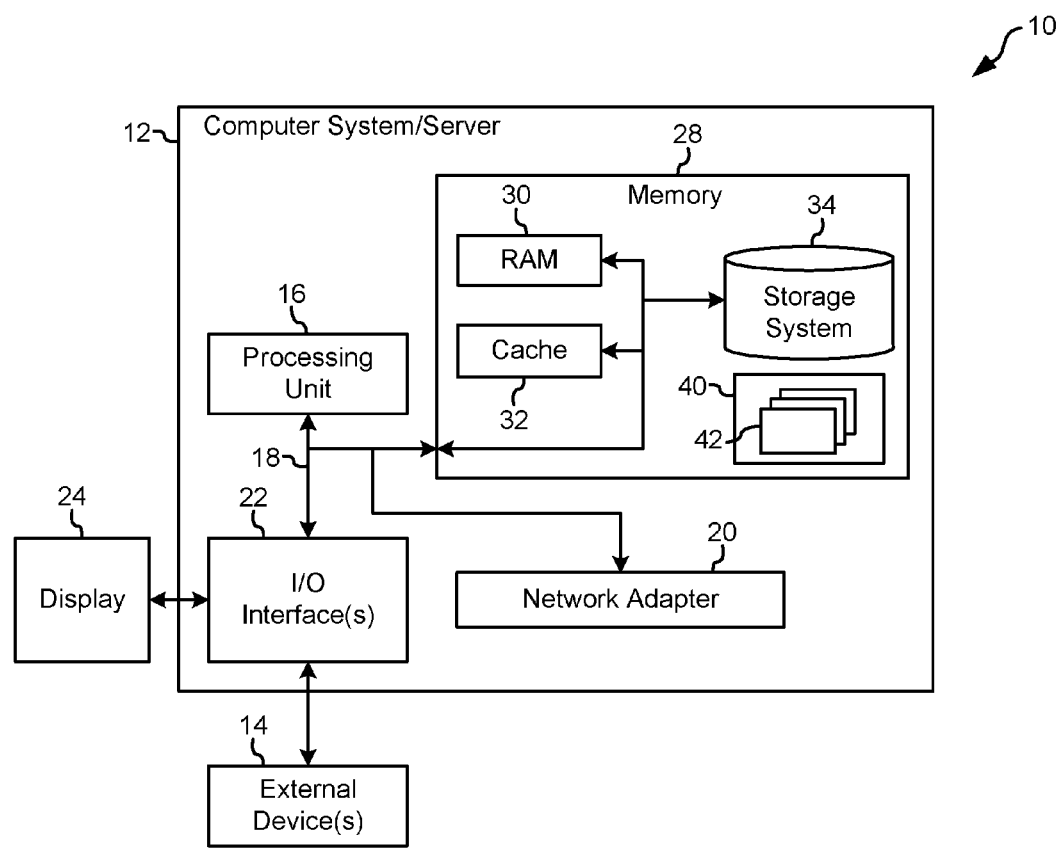
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to some embodiments presented herein, grid architectures may be enhanced to allow for the following capabilities: defining specific groups of clusters and/or sites ("a DR family") which share a copy of data from one or more virtual tapes ("backup copy"), making a point-in-time copy ("snapshot," which may be a flash copy or some other suitable point-in-time copy known in the such) of a virtual tape at time-zero, managing the ownership of the snapshot tape independent of the ownership for the live virtual tape instance (which keeps changing) and the backup copy, making a virtual tape comprising the snapshot accessible to the DR host only when the snapshot is made consistent before the time-zero, using the live copy of the virtual tape instead of a snapshot to satisfy a private/specific mount request from a DR host when there is no consistent snapshot available within the DR family, and integrating selective device access control with the snapshot function (which allows multiple hosts to view their own set of a snapshots of virtual tapes).

In one general embodiment, a system includes a processor and logic integrated with and/or executable by the processor, the logic being configured to cause the processor to access a snapshot of data stored on one or more DR clusters within a disaster recovery (DR) family only when the snapshot was made consistent with respect to data on one or more production clusters within the DR family before a time-zero, and perform DR testing using the snapshot, wherein the time-zero represents a time selected to simulate a disaster, wherein the DR family includes one or more DR clusters accessible to a DR host and the one or more production clusters accessible to a production host, and wherein the DR host is configured to replicate data from the one or more production clusters to the one or more DR clusters.

In another general embodiment, a method for DR testing includes accessing a snapshot of data stored on one or more DR clusters within a DR family only when the snapshot was made consistent with respect to data on one or more production clusters within the DR family before a time-zero, and performing DR testing using the snapshot, wherein the time-zero represents a time selected to simulate a disaster, wherein the DR family includes one or more DR clusters accessible to a DR host and the one or more production clusters accessible to a production host, wherein each cluster includes one or more storage nodes representing a storage device, and wherein the DR host is configured to replicate data from the one or more production clusters to the one or more DR clusters.

According to yet another general embodiment, a computer program product for DR testing includes a computer readable storage medium having program code embodied therewith, the program code being readable and/or executable by a processor to determine which cluster within a DR family to access, via a DR host, a snapshot of data from based on a consistency of the snapshot in relation to data on one or more production clusters at a time-zero, wherein the time-zero represents a time selected to simulate a disaster, and wherein the DR family includes one or more DR clusters accessible to the DR host and the one or more production clusters accessible to a production host, wherein the DR host is configured to replicate data from the one or more production clusters to the one or more DR clusters, allow access, via a first DR cluster, to snapshots on any of the one or more DR clusters within the DR family, access the snapshot stored on the one or more DR clusters within the DR family only when the snapshot was made consistent with respect to data on the one or more production clusters within the DR family before a time-zero, wherein the snapshot is accessed from a second cluster within the DR family when a first cluster within the DR family does not include an up-to-date snapshot, and perform DR testing using the snapshot.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
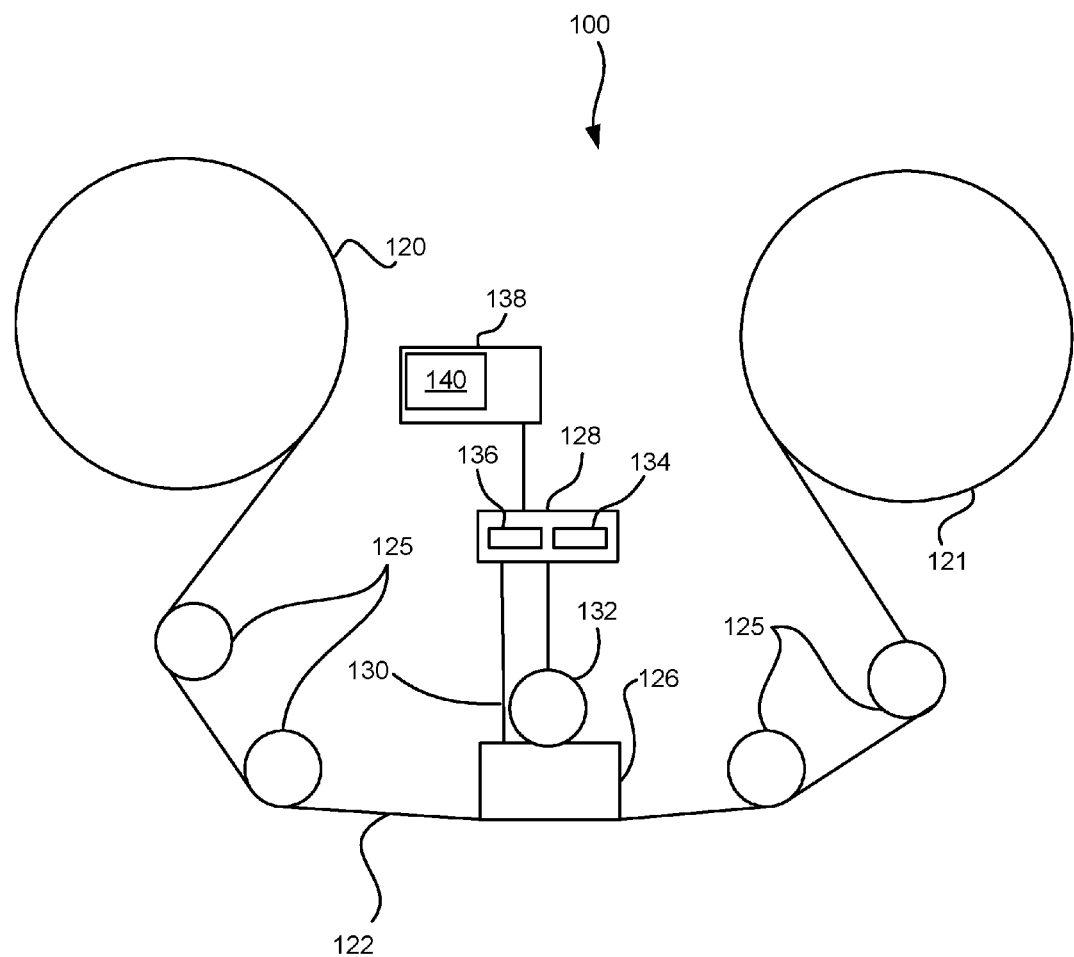
FIG. 2 illustrates a simplified tape drive of a tape-based data storage system, according to one embodiment.

FIG. 2 illustrates a simplified tape drive 100 of a tape-based data storage system, which may be employed according to various embodiments. While one specific implementation of a tape drive is shown in FIG. 2, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the tape drive 100. The tape drive, such as that illustrated in FIG. 2, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 2) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be split into one or more sections, with one section being a reserved data buffer 140 to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Some terms used herein are now described according to one embodiment.

A backup copy is a copy of a virtual tape. All virtual tape copies in a current or previous release are referred to as backup copies, while the latest generation of the virtual tape is the live copy. This is the live instance of a volume in a cluster. Meaning, it is a volume that may exist in the live read-write file system or an instance that may be modified by replication and/or production activity.

A flash copy is a snapshot of a backup copy or live copy at a certain time. The content in the flash copy is fixed and does not change even if the live copy or backup copy are modified. A flash copy may not exist if a live volume or backup copy was not present at the certain time. In addition, a flash copy does not imply consistency with the live copy, as a backup copy may have been used for the flash copy and was inconsistent with the live copy at the certain time, which would result in a flash copy which is inconsistent with the live copy.

A disaster recovery (DR) family is a set of clusters which serve a purpose of disaster recovery. One to seven clusters may be assigned to a DR family, in one approach. Each DR family may have a unique index value, 1 to 8 (total 8) in this approach. The DR family may be used to determine which clusters should be affected by a flash request via a host command line or web interface It also informs microcode of which clusters are applicable during ownership negotiation of the ownership of a flash copy or the selection of a cluster to satisfy a virtual tape mount which targets a flash copy. A cluster may exist in more than one DR family at a time. Each DR family has its own time-zero and all clusters in the same DR family share the time-zero and other DR family attributes.

A flash family (FF) is a subset of or all clusters in a DR Family. Those clusters which at time zero implemented a flash copy of all relevant volumes.

A write protect mode is when writing is prohibited on a cluster, so that any host commands fail when they are issued to logical devices in that cluster and attempt to modify a volume's data or attributes. The flash copy is created on a cluster when it is in the write protect mode only in one approach.

Write protect exclusion category indicates all volumes that are not in write protect mode. This category is usually used to allow a DR host to run write jobs on a write protected cluster.

Write protected category indicates all volumes that are in write protect mode. The microcode may view volumes assigned to this category as write-protected.

Time-zero may indicate a time when a flash copy is generated within a DR family for DR testing, e.g., it simulates a disaster starting. The time-zero mimics the time when real disaster happens, and a user may establish the time-zero using a host console command or web interface, in some approaches.

Virtual tape user data indicates data of a virtual tape that is used by a customer to store information. It may be stored in a UNIX file system or some other suitable storage system. It is contrasted to virtual tape metadata, which stores attributes of a virtual tape, such as category, constructs, data level, ownership, etc. These may be stored in a database.

A DR family is a set of clusters or sites in a grid architecture which are configured for disaster recovery operations. Each cluster or site may comprise one or more storage nodes which represent a storage device. A cluster or site may exist in more than one DR family at a time, according to one approach. Each DR family has its own time-zero representing the time at which the copy was made that is represented by the DR family, and all clusters in the same DR family share the identical time-zero, along with all other DR family attributes. The DR family is used to determine which clusters or sites are affected by a snapshot initiation request, which may be initiated by a user or automatically according to some predetermined routine or schedule.

According to one embodiment, the value of the time-zero is not established when a DR family is defined, and instead is established when a user enables snapshot within the DR family, such as via the microcode. The time-zero value is then shared among all clusters or sites within the DR family.

When a snapshot request is issued against a DR family, such as by a user, a point-in-time snapshot or copy of the file system, which includes a user data portion of all virtual tapes, is created on all clusters or sites within the DR family, according to one embodiment. The time-zero is established when the file system snapshot is completed within the DR family and it is shared with all clusters or sites within the DR family. A metadata portion of the virtual tapes are not created at this stage, in one approach.

In order to make a snapshot of a virtual tape accessible from a DR host, not only the snapshot of the user data portion, but also the snapshot of the metadata portion is generated. Some grid architectures are capable of handling four million virtual tapes or more. It may take a much longer time to create a snapshot of the whole database in comparison with the time needed to create a snapshot of the user data portion only (currently, some file systems may take a snapshot that completes within several seconds). Therefore, in one embodiment, a method to create metadata of virtual tapes efficiently is presented.

The microcode, according to one embodiment, solves this issue by creating the snapshot of metadata selectively and based on an event. This allows the microcode to create the snapshot of metadata which really needs to be created, and not all metadata indiscriminately.

In one embodiment, the point-in-time snapshot of the metadata of a virtual tape may be created only when the virtual tape is in a 'write-protected' state. As described above, existing 'selective write-protect' functionality allows users to define virtual tapes which are used by the DR host only. This means the production host is unaware of the volumes, and therefore the DR clusters do not need to make a snapshot of such volumes. Thus, it is enough for the microcode to create a snapshot of virtual tapes assigned to write-protected categories (which are indicated as needing a snapshot taken thereof, possibly by the user or automatically according to some parameters or conditions being satisfied).

According to another embodiment, a point-in-time snapshot of the metadata of a virtual tape may be created only when specific events occur. Not all write-protected volumes are used in DR testing or some that are used for some DR testing may not be used in other DR testing. Meaning, taking a snapshot of the metadata of all virtual tapes is not required in most DR testing. Therefore, in this embodiment, the microcode creates a snapshot of the metadata of a virtual tape only when data consistency of the volume or key attributes (such as category, type, location, etc.) of the volume is changed, or, the DR host mounts the virtual tape. Specifically, according to one embodiment, the microcode will create a snapshot of the metadata of a write protected virtual tape when all the following conditions are true:

1. Time-zero has been established in the DR family (i.e., a snapshot of the user data portion of the virtual tapes has already been created).

2. One of following events occurs on the write protected virtual tape:
   a. The production host is or has modified data content and/or key attributes of the virtual tape.
   b. The DR host mounts the snapshot of the volume and the snapshot of the metadata has not yet been generated.

The unique ownership of a snapshot may be defined and managed independently to the ownership of an active virtual tape (e.g., the live copy). In this embodiment, the limitation that ownership of all copies of data is unified is overcome by managing the ownership of a snapshot independent of the ownership of a live copy so that a production host and a DR host may mount a virtual tape with the same identifier (such as a volume serial number "volser" or some other known type of identifier understood by each component in the system) at the same time (e.g., the production host mounts the live copy and the DR host mounts the snapshot). This may be managed using the microcode, as would be understood by one of skill in the art.

As described previously, once a snapshot of the metadata is created on a DR cluster within the DR family, the ownership of a snapshot may be managed, such as via the microcode, independent of a live copy because the microcode uses the snapshot version of the metadata when it handles the snapshot, and not the live copy, according to one embodiment. The microcode leaves the ownership of the snapshot virtual tape in an "ownership undetermined" state when the snapshot of the metadata is created first. This causes the ownership of the snapshot virtual tape to be left in this state until accessed by a DR host, e.g., the microcode leaves the ownership alone. Leaving the ownership in the undetermined state until it is "really needed" (e.g., accessed by the DR host) allows the microcode to reduce its impact to the production host's job performance. If the (metadata) snapshot is created by DR host mount processing, the ownership is determined within the DR family immediately by the ownership discovering process. The scope of the ownership discovery process is limited to being only within the DR family.

According to another embodiment, a point-in-time copy of a virtual tape is ensured to be accessible from the DR host only when the virtual tape was made consistent before the time-zero. During a DR test, the DR clusters within a DR family provide a view of volume consistency at the time-zero to a DR host. This means that it is determined, such as by the microcode, which cluster or clusters within the DR family comprises such a copy when a DR host tries mount the snapshot. This embodiment allows for verification that only up-to-date copies will be presented as a point-in-time copy, and not some copy made previously which may be out of date and inconsistent with the live copy or a backup copy made later which would not mimic a true disaster.

Now referring to FIGS. 3A-3D, virtual tape mounts initiated by a DR host 308 are shown according to some exemplary embodiments. System 300 comprises a production host 306 configured to access data on one or more production clusters 312, 314, at a production site 302. System 300 also includes the DR host 308 configured to access data on one or more DR clusters 316, 318 at a DR site 304. The production site 302 and DR site 304 are connected by a network 310, such as grid network, WAN, etc. The production site 302 comprises one or more production clusters. In this exemplary embodiment, Cluster 0 (CL0) 312 and Cluster 1 (CL1) 314 are shown in the production site 302; however, any number of production clusters may be used. The DR site 304 comprises one or more DR clusters.

In this exemplary embodiment, Cluster 2 (CL2) 316 and Cluster 3 (CL3) 318 are shown in the DR site 304; however, any number of DR clusters may be used. Furthermore, production host 306 has access to one or more direct access storage devices (DASDs) 344, while DR host 308 has access to one or more DASDs 346. The DASDs 344, 346 may be used to store any data useful in copying procedures and/or hosting functions of the production host 306 and/or DR host 308, in various approaches.

Each production cluster may include, host, store, and/or represent one or more instances of one or more data units. An instance may be a file, a directory, a volume, a virtual tape, or any other subunit of data as would be known by one of skill in the art. One or more production clusters may comprise duplicate data to one or more other production clusters. As shown in this exemplary embodiment, CL0 312 comprises two virtual tapes, virtual tape 320 having a volser of A00000 and virtual tape 322 having a volser of A00001, and CL1 314 comprises two virtual tapes, virtual tape 324 having a volser of A00000 and virtual tape 326 having a volser of A00001. However, any number and/or type of instances of data may be represented in each production cluster.

Moreover, each DR cluster may include, host, store, and/or represent one or more instances of one or more data units. An instance may be a file, a directory, a volume, a virtual tape, or any other subunit of data as would be known by one of skill in the art. One or more DR clusters may comprise duplicate data (e.g., a backup copy) to data that is stored on one or more other DR clusters and/or production clusters. As shown in this exemplary embodiment, CL2 316 comprises two backup copies, backup copy of volser A00000 328 and backup copy of volser A00001 330, and CL3 318 comprises two backup copies, backup copy of volser A00000 332 and backup copy of volser A00001 334. However, any number and/or type of backup copies and/or instances of data may be represented in each DR cluster.

Figure 3A:
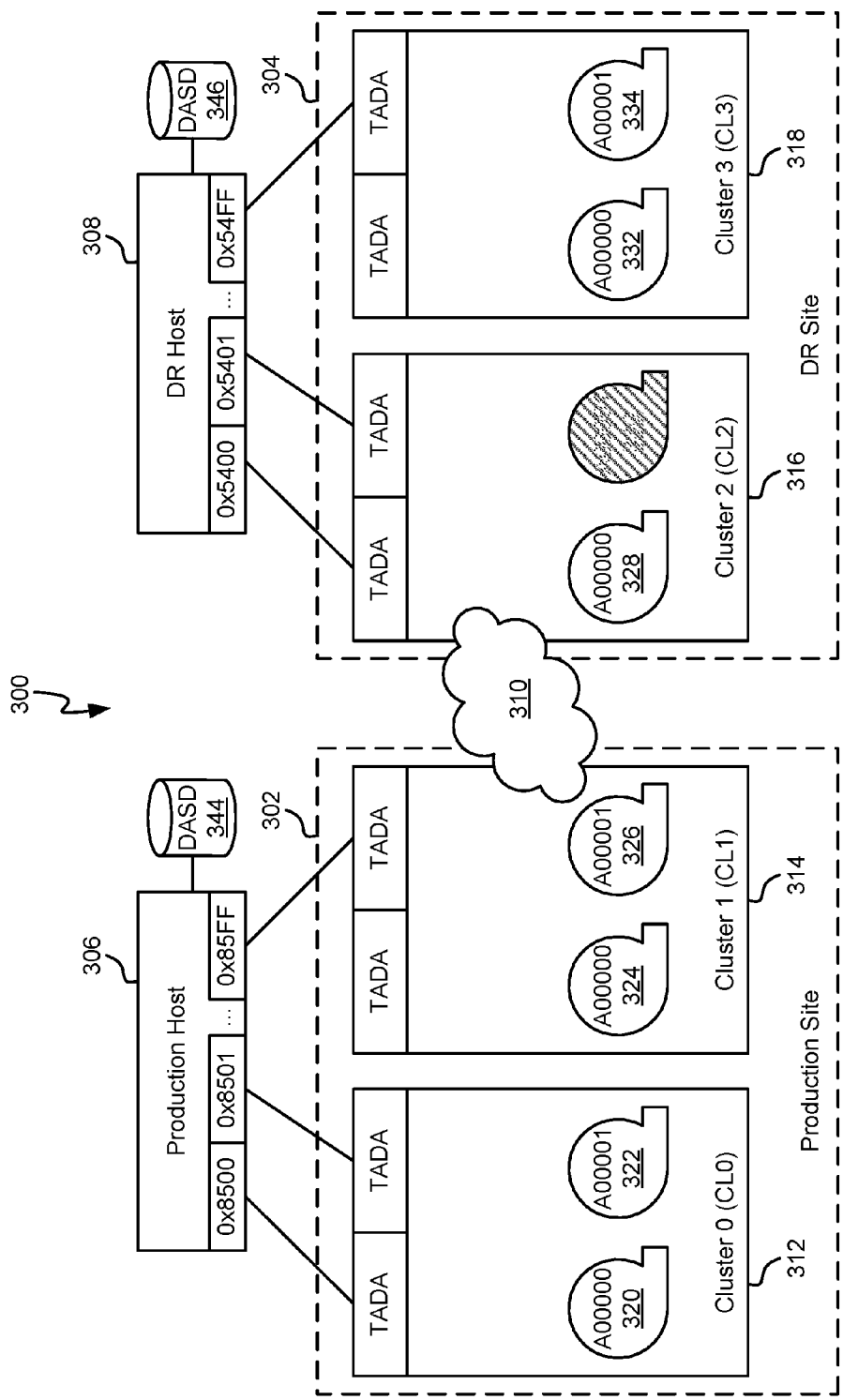
FIGS. 3A-3D show a system for replicating data, according to one embodiment.

Referring now to FIG. 3A, backup copy A00001 330 is shown as being stale or out-of-date with data on virtual tape A00001 322 or virtual tape A00001 326. Therefore, data in backup copy A00001 330 should not be used as an accurate duplicate of the data stored on virtual tape A00001 322 or virtual tape A00001 326, which are reliable duplicates of one another. All the other backup copies (e.g., backup copy 332, backup copy 334, etc.) on the DR clusters CL2 316 and CL3 318 are up-to-date with their respective virtual tapes on CL0 312 and CL1 314 from which data is duplicated.

When performing DR testing to test the preparedness of the DR site 304, it is not desired to stop duplicating data to the DR clusters 316, 318 because an actual disaster may take place, and the data must be backed-up. Therefore, the data in the backup copies (e.g., 328, 330, 332, etc.) may continue to change during the DR testing, which provides false impressions of the disaster preparedness of the DR site 304, unless the data is somehow frozen in time.

Figure 3B:
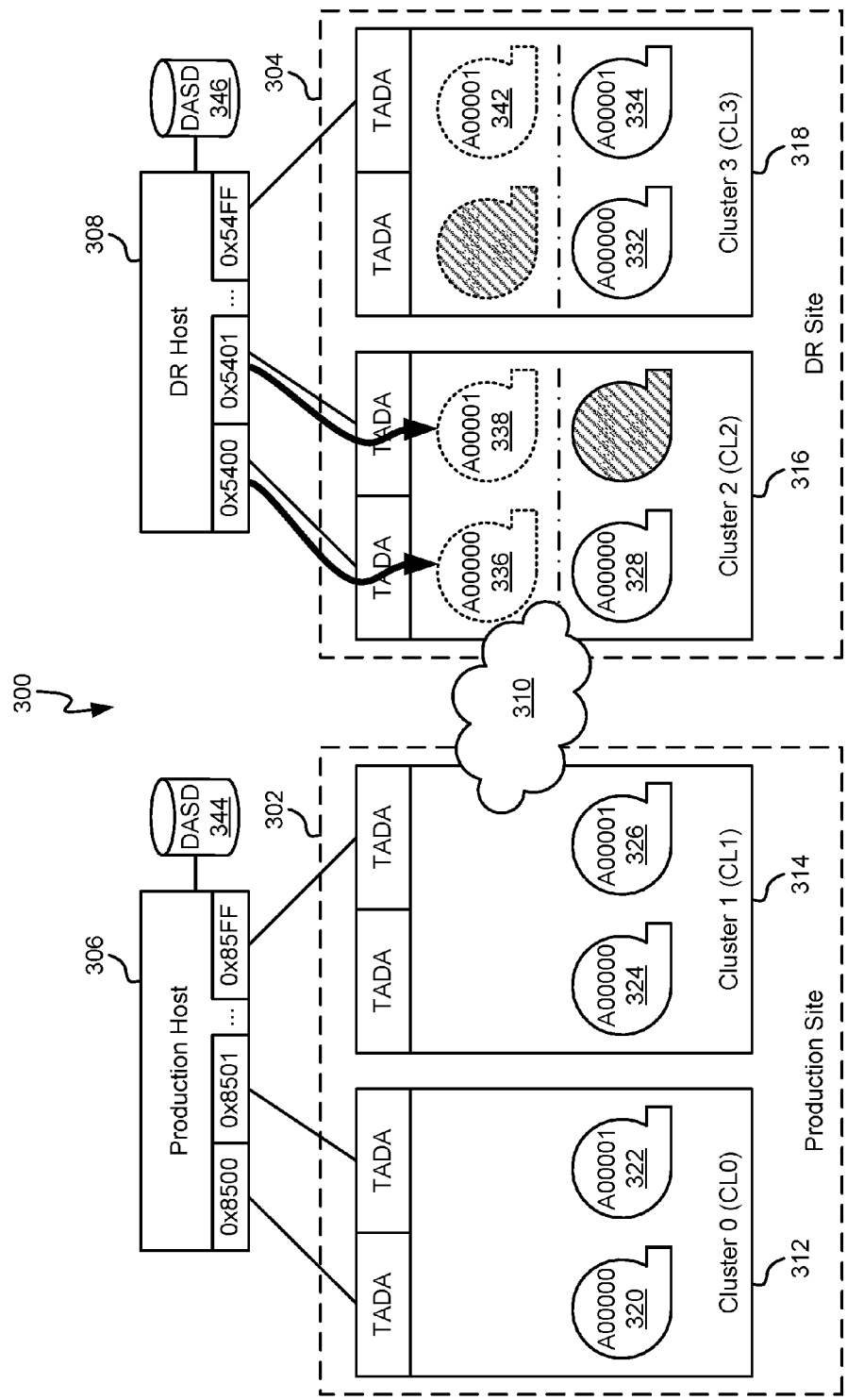

With reference to FIG. 3B, when an actual disaster takes place unexpectedly, it is beneficial for the DR host 308 to have access to all the data that is stored on the production site 302 (which presumably is no longer accessible due to the disaster) via data stored on the DR site 304. In order for this to happen, the DR site 304 must continually update the data which is stored in the individual DR clusters.

Therefore, in order to perform a DR test to determine how well the data on the production site 302 is represented on the DR site 304, and without stopping duplication efforts from the production site 302, one or more snapshots (e.g., flash copies, physical tape backup copies having virtual representations that mimic flash copies, etc.) may be created that represent all the data stored on each DR cluster at a predetermined time (e.g., a time-zero). These snapshots are indicated by the virtual tapes having dashed lines, e.g., snapshot of volser A00000 336, snapshot of volser A00001 338, etc. CL2 316 and CL3 318 together now represent a flash family, because all the data stored on CL2 316 and CL3 318 have at least one snapshot produced thereof at a time-zero.

In one such embodiment, a time-zero may be selected which represents a simulated disaster event occurrence time (time at which a disaster took place). In DR testing, the DR host 308 may attempt to access these one or more snapshots of the data in the DR clusters 316, 318 to determine how successful the backup copy on the DR clusters 316, 318 are in case of an actual disaster.

When the DR host 308 issues a mount request targeting a volume having a volser of A00000 to CL2 316, the DR host 308 may provide a snapshot of volser A00000 336 within the cluster to satisfy the mount request because the snapshot of volser A00000 336 is consistent at the time-zero. In this scenario, CL2 316 is capable of accessing a snapshot of both volumes A00000 and A00001, because snapshots 336 and 338 are up-to-date at the time-zero, as indicated by their white solid tape representations.

Figure 3C:
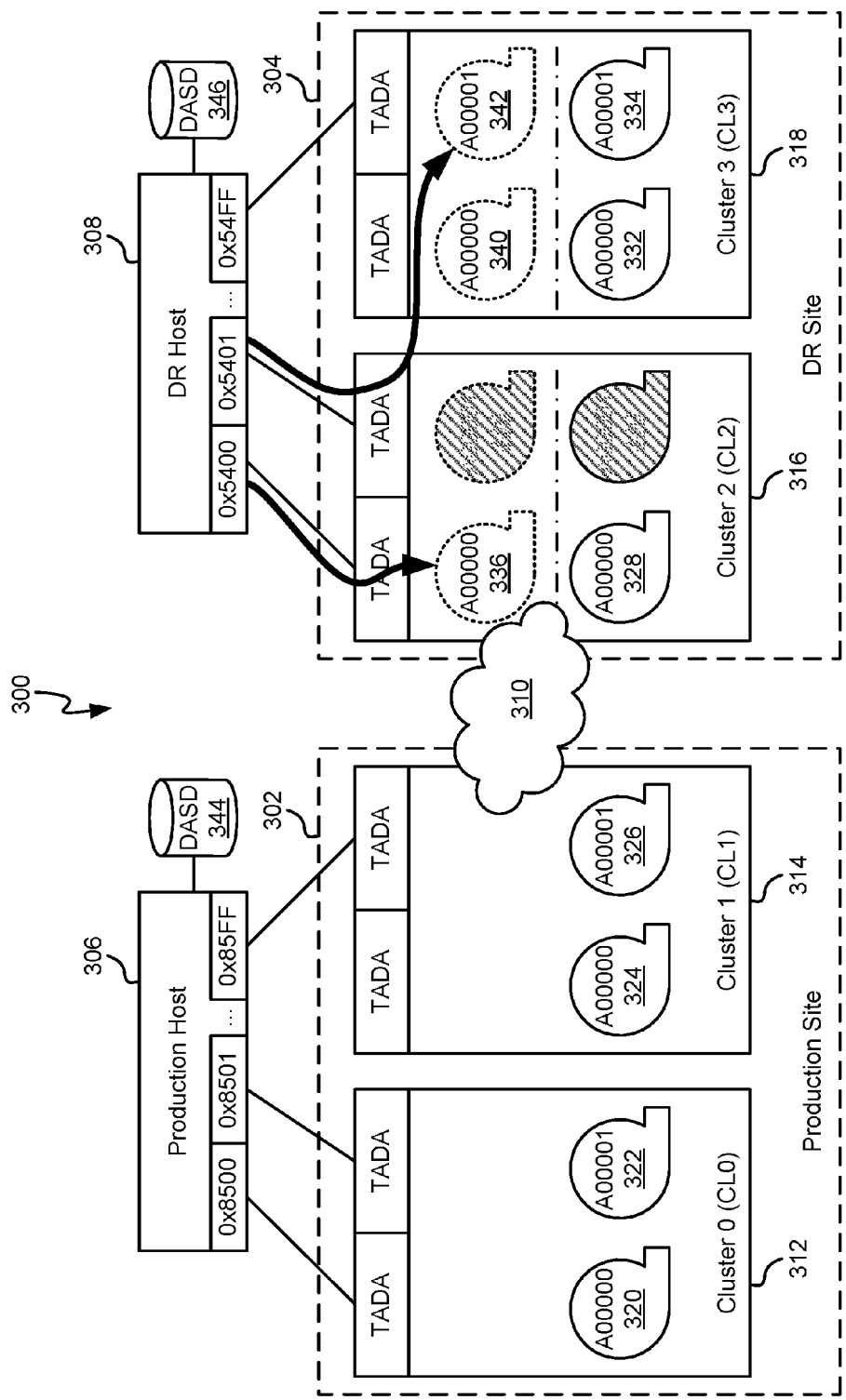

Now a scenario where a cluster does not include an up-to-date snapshot is described. With reference to FIG. 3C, assume that a volume having a volser of A00001 is requested to be mounted. CL2 316 is not able to satisfy the mount request by itself because the snapshot of volser A00001 338 on CL2 316 is not consistent at the time-zero, as indicated by the cross-hatching (although the live copy version may be replicated to the cluster 316 sometime after the time-zero and may become up-to-date, it would still be stale, as indicated by the cross-hatching in backup copy of volser A00001 330). In this example, CL2 316 completes the mount request targeting A00001 by using a snapshot of volser A00001 342 on the other cluster, CL3 318, in the same DR family. Snapshot 342 is up-to-date and consistent at the time-zero, and therefore may be used in DR testing. This functionality may be achieved, in one approach, by looking at the snapshot of the metadata within the DR family only when it is determined, such as via the microcode, which cluster to provide a snapshot to the DR host 308 with.

Figure 3D:
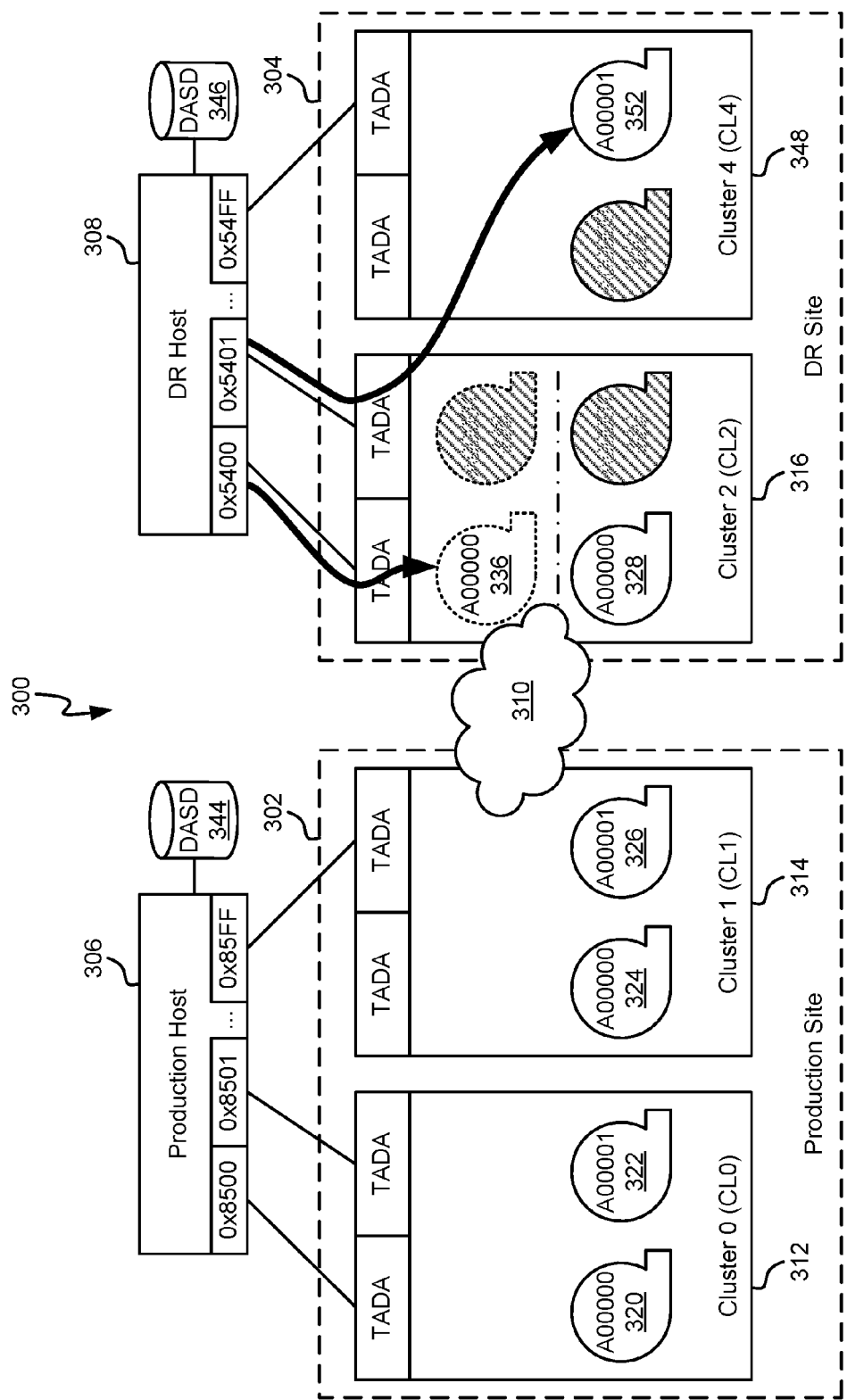

Now referring to FIG. 3D, a scenario where a snapshot of a requested volume is not available and a live or backup copy is used instead is described, in accordance with one embodiment. In this scenario, assume that a request for volumes A00000 and A00001 is issued to the DR host 308. The DR host 308 may access the snapshot of volser A00000 336 on CL2 316, but the snashot of volser A00001 338 on CL2 316 is inconsistent at time-zero. Also, the backup copy of volser A00001 330 on CL 2 316 is stale at time-zero. However, another cluster CL4 348 within the DR family has a backup copy of volser A00001 352 which is up-to-date at the time-zero. Therefore, CL2 316 may access the backup copy of volser A00001 352 on CL4 348 to fulfill the mount request in the DR testing. As shown, the backup copy of volser A00000 350 on CL4 348 could not be used, because it is stale at the time-zero.

Of course, the particular scenarios described in relation to FIGS. 3A-3D are for explanatory purposes only, and any arrangement of sites, clusters, virtual tapes, backup copies, snapshots, and data may be used, as would be understood by one of skill in the art upon reading the present descriptions.

Figure 4:
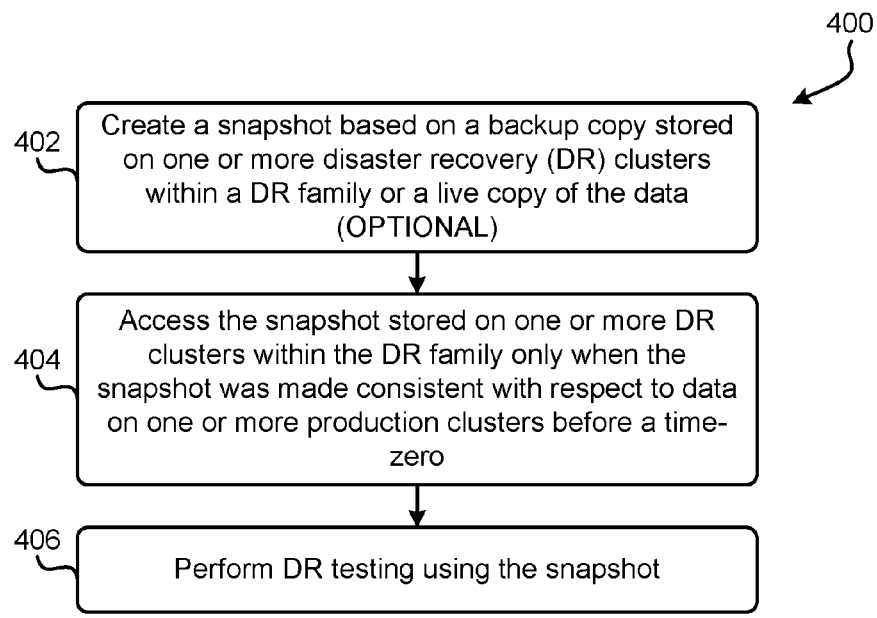
FIG. 4 shows a flowchart of a method, according to one embodiment.

Now referring to FIG. 4, a method 400 for performing DR testing is shown according to one embodiment. The method 400 may be performed in accordance with the present invention in any of the environments depicted in FIGS. 1-3D, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various non-limiting embodiments, the method 400 may be partially or entirely performed by a tape drive, a hard disk drive, an optical drive, a controller, a hierarchal storage manager, a storage library manager, a processor (such as a CPU, an ASIC, a FPGA, etc.) which may be embedded in and/or operate within a system, etc.

As shown in FIG. 4, method 400 may initiate with optional operation 402, where a snapshot based on a backup copy of data stored on one or more DR clusters within a DR family or a live copy of the data is created. The snapshot may be stored on more than one cluster within the DR family.

In another approach, the snapshot may selectively include a metadata portion of any virtual tape that is in a 'write-protected' state.

Also, the DR host may create the snapshot of the metadata portion of the virtual tapes during mount processing. In this process, ownership of the snapshot of the metadata portion of the virtual tapes is determined within the DR family immediately by an ownership discovering process, and a scope of the ownership discovering process is limited to being only within the DR family. This ownership discovering process may be of a type known in the art, such as that described in U.S. Pat. No. 7,991,822, issued Aug. 2, 2011, which is herein incorporated by reference.

In operation 404, the snapshot of data stored on the one or more DR clusters within the DR family is accessed only when the snapshot was made consistent with respect to data on one or more production clusters within the DR family before a time-zero. The time-zero represents a time selected to simulate a disaster, and the DR family comprises one or more DR clusters accessible to a DR host and the one or more production clusters accessible to a production host. Also, each cluster comprises one or more storage nodes representing a storage device, and the DR host is configured to replicate data from the one or more production clusters to the one or more DR clusters.

In one embodiment, method 400 may include ensuring that only snapshots that are up-to-date and consistent at the time-zero are presented to the DR host for use in the DR testing. This may be accomplished, in one embodiment, by determining which cluster within the DR family to access the snapshot from based on a consistency of the snapshot in relation to data on the one or more production clusters at the time-zero.

In operation 406, DR testing is performed using the snapshot. The DR testing may be performed according to any method or process, as would be known by one of skill in the art, as long as it is carried out with data that was made consistent prior to the time-zero.

In one approach, method 400 may further include defining and managing unique, independent ownerships of the backup copy, an active virtual tape from which data for the backup copy was copied, and the snapshot. In this way, any of the three instances of data may be accessed at the same time.

Furthermore, method 400 may include allowing the DR host to mount a first virtual tape having a first identifier that comprises the backup copy and/or a second virtual tape having the first identifier that comprises the snapshot simultaneously with the production host mounting a third virtual tape having the first identifier that comprises the data stored to the one or more production clusters.

In another embodiment, method 400 may include allowing access, via a first DR cluster, to snapshots on any of the one or more DR clusters within the DR family. This is possible because all the snapshots are accessible and/or stored to each of the clusters (or DR clusters) within the DR family.

Moreover, in one embodiment, a snapshot from a second cluster within the DR family may be accessed when a first cluster within the DR family does not include an up-to-date snapshot.

Method 400 may be executed, implemented in, and/or available to be performed using a system, apparatus, and/or computer program product, according to various embodiments.

According to one embodiment, an apparatus may include a processor (such as a hardware and/or software processor alone or in combination with the hardware processor) and logic integrated with and/or executable by the processor. The logic may be software-based, hardware-based, and/or a combination thereof according to various approaches. Execution of the logic may cause the processor to perform method 400 or some portion thereof.

In another embodiment, a computer program product may include a computer readable storage medium having program code embodied therewith, the program code being readable and/or executable by a processor. The processor may be implemented in hardware and/or software alone or in combination, and execution of the program code may cause the processor to perform method 400 or some portion thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for disaster recovery (DR) testing, the method comprising:

creating a snapshot of data based on a backup copy of data stored on one or more production clusters or a live copy of the data;

storing the snapshot on more than one DR cluster within a DR family;

determining which cluster within the DR family to access the snapshot from based on a consistency of the snapshot in relation to data on the one or more production clusters at a time-zero;

accessing the snapshot of data stored on the determined DR cluster within the DR family only when the snapshot was made consistent with respect to data on the one or more production clusters within the DR family before the time-zero;

performing DR testing using the snapshot;

defining and managing unique, independent ownerships of the backup copy, an active virtual tape from which data for the backup copy was copied, and the snapshot; and allowing a DR host to mount a first virtual tape having a first identifier that comprises the backup copy and/or a second virtual tape having the first identifier that comprises the snapshot simultaneously with a production host mounting a third virtual tape having the first identifier that comprises the data stored to the one or more production clusters, wherein the time-zero represents a time selected to simulate a disaster, the DR family comprises one or more DR clusters accessible to the DR host and the one or more production clusters accessible to the production host, each DR cluster comprises one or more storage nodes representing a storage device, and the DR host is configured to replicate data from the one or more production clusters to the one or more DR clusters.

2. The method as recited in claim 1, further comprising allowing access, via a first DR cluster, to snapshots on any of the one or more DR clusters within the DR family.

3. The method as recited in claim 1, further comprising ensuring that only snapshots that are up-to-date and consistent at the time-zero are presented to the DR host for use in the DR testing.

4. The method as recited in claim 1, further comprising accessing a snapshot from a second cluster within the DR family when a first cluster within the DR family does not include an up-to-date snapshot.

5. The method as recited in claim 1, wherein the snapshot selectively includes a metadata portion of any virtual tape that is in a 'write-protected' state, wherein the DR host creates the snapshot of the metadata portion of the virtual tapes during mount processing, wherein ownership of the snapshot of the metadata portion of the virtual tapes is determined within the DR family immediately by an ownership discovering process, and wherein a scope of the ownership discovering process is limited to being only within the DR family.

6. A computer program product for disaster recovery (DR) testing, the computer program product comprising a computer readable storage medium having program instructions embodied therewith, the program instructions being readable and/or executable by a processor to cause the processor to:

create, by the processor, a snapshot of data based on a backup copy of data stored on one or more production clusters or a live copy of the data;

store, by the processor, the snapshot on more than one DR cluster within a DR family;

determine, by the processor, which cluster within the DR family to access the snapshot from based on a consistency of the snapshot in relation to data on the one or more production clusters at a time-zero;

access, by the processor, the snapshot of data stored on the determined DR cluster within the DR family only when the snapshot was made consistent with respect to data on the one or more production clusters within the DR family before the time-zero;

perform, by the processor, DR testing using the snapshot;

define and manage, by the processor, unique, independent ownerships of the backup copy, an active virtual tape from which data for the backup copy was copied, and the snapshot; and allow, by the processor, a DR host to mount a first virtual tape having a first identifier that comprises the backup copy and/or a second virtual tape having the first identifier that comprises the snapshot simultaneously with a production host mounting a third virtual tape having the first identifier that comprises the data stored to the one or more production clusters, wherein the time-zero represents a time selected to simulate a disaster, the DR family comprises one or more DR clusters accessible to the DR host and the one or more production clusters accessible to the production host, each DR cluster comprises one or more storage nodes representing a storage device, and the DR host is configured to replicate data from the one or more production clusters to the one or more DR clusters.

7. The computer program product as recited in claim 6, wherein the program instructions are further readable and/or executable by the processor to cause the processor to:

allow access, via a first DR cluster, to snapshots on any of the one or more DR clusters within the DR family.

8. The computer program product as recited in claim 6, wherein the program instructions are further readable and/or executable by the processor to cause the processor to:

ensure, by the processor, that only snapshots that are up-to-date and consistent at the time-zero are presented to the DR host for use in the DR testing.

9. The computer program product as recited in claim 6, wherein the program instructions are further readable and/or executable by the processor to cause the processor to:

access, by the processor, a snapshot from a second cluster within the DR family when a first cluster within the DR family does not include an up-to-date snapshot.

10. The computer program product as recited in claim 6, wherein the snapshot selectively includes a metadata portion of any virtual tape that is in a 'write-protected' state, wherein the DR host creates the snapshot of the metadata portion of the virtual tapes during mount processing, wherein ownership of the snapshot of the metadata portion of the virtual tapes is determined within the DR family immediately by an ownership discovering process, and wherein a scope of the ownership discovering process is limited to being only within the DR family.

* * * * *